United States Patent [19]

Lowrey, III

[11] Patent Number: 4,910,912

[45] Date of Patent: Mar. 27, 1990

[54] AQUACULTURE IN NONCONVECTIVE SOLAR PONDS

[76] Inventor: O. Preston Lowrey, III, 2578 Moonstone Dr., San Diego, Calif. 92123

[21] Appl. No.: 812,980

[22] Filed: Dec. 24, 1985

[51] Int. Cl.[4] ...................... A01G 31/00; A01K 61/00
[52] U.S. Cl. ........................................... 47/62; 47/1.4; 47/59; 119/2; 119/3; 119/4
[58] Field of Search .................. 47/1.4, 59, 62, 17; 119/2, 3, 4; 126/415, 419

[56] References Cited

U.S. PATENT DOCUMENTS

| Re. 30,038 | 6/1979 | Sweeney | 119/4 X |
|---|---|---|---|
| 3,473,509 | 10/1969 | Miyamura | 119/2 |
| 3,650,068 | 3/1972 | Meyer | 47/1.4 |
| 3,998,186 | 12/1976 | Hodges | 119/2 |
| 4,235,043 | 11/1980 | Harasawa | 47/17 |
| 4,249,518 | 2/1981 | Holt | 126/419 |
| 4,446,025 | 5/1984 | Assaf et al. | 210/602 |
| 4,452,227 | 6/1984 | Lowrey, III | 126/415 |
| 4,554,390 | 11/1985 | Curtain et al. | 47/1.4 |
| 4,595,505 | 6/1986 | Dor | 47/1.4 |
| 4,658,757 | 4/1987 | Cook | 119/3 |

OTHER PUBLICATIONS

Idso, Sherwood B. and Keith E.; Solar Energy, vol. 33, No. 2, pp. 149–154, Dec. 28, 1984.

Fuss, Joseph T.; Aquacultural Engineering, 3 (1984); pp. 31–37.

Persyn, Harvey O.; Research and Development, pp. 105–109, Jun. 1984.

*Primary Examiner*—Randolph A. Reese
*Assistant Examiner*—Jeffrey L. Thompson

[57] ABSTRACT

Apparatus is presented for cultivating aquaculture and mariculture crops predominantly in the warm storage zone (SZ) of a durable, salt gradient, solar pond. This SZ would be maintained near the optimum salinity and temperature for the particular crop and especially guarded against overheating. The nonconvective zone (NCZ) of this pond would insulate the SZ and buffer diurnal temperature oscillations in this SZ. Variations of the basic invention include using a partition to separate the SZ and NCZ, not using a pond liner, and adding heat from an external source to the SZ, such as geothermal or power plant waste heat. Because temperature elevations will usually be only 10° to 25° C., it will commonly be possible to insure stable stratification with modest salinity changes and to supply sufficient heat from directly absorbed solar energy alone. These solar ponds could economically provide optimum growing conditions fall through spring in temperate latitudes. Three variations are worth particularly noting. In solar ponds in dry climates the SZ could have a salinity near 12% while the UCZ was near 2%. High salinity crops would be cultivated in the SZ such as Artemia, the brine shrimp, or Dunaliella, an algae. An attractive variation for locations near the shore would use a fresh water UCZ, and cultivate marine crops in a seawater SZ. Fresh water crops could be cultivated in a fresh water SZ separated by a partition form a stable, saline NCZ. All of these ponds could be very inexpensive, located outdoors at a wide variety of sites, many of which are now not useful, and provide optimum growing conditions and high productivity yearround. Moreover cultivating crops in a solar pond will require less sophisticated engineering and management of the pond than extracting energy from it.

9 Claims, 1 Drawing Sheet

AQUACULTURE IN NONCONVECTIVE SOLAR PONDS

FIELD OF INVENTION

This invention relates to salinity gradient solar ponds. More specifically, this invention relates to the cultivation of crops for food, feed, energy, or chemicals primarily in the suitably warm and saline storage zone of a salinity gradient solar pond. This cultivation in solar ponds would occur at locations where; or during seasons when outdoor cultivation would otherwise be significantly restricted by the cold.

BACKGROUND ON SOLAR PONDS

Salinity gradient or nonconvecting solar ponds are patterned after natural, meromictic lakes (Tabor, and Weinberger, 1981). As depth increases in these lakes, the salinity increases to such an extent that the density increases even though the temperature simultaneously increases. The absorption of sunlight in the semi-transparent water causes the temperature increase. This density pattern consequently suppresses cooling by natural convection.

Typically ponds develop four distinct zones. At the surface is a homogenized zone called the upper convective zone (UCZ). This zone is stirred by the wind and evaporation, and is usually 0.2–0.4 m thick. Since it absorbs sunlight but does not help suppress convection, it is desirable to keep the UCZ as thin as possible. In very large ponds, this is often achieved by reducing the fetch over which the wind can build waves by floating a grid of netting on the pond's surface. There are, however, other factors, such as evaporation, that contribute to UCZ development and therefore UCZ control is not fully understood. New methods of UCZ control are likely in the future.

Beneath the UCZ is the nonconvecting zone (NCZ) which is usually 0.9–1.3 m thick. It is in this stratified zone that the salinity, density, and consequently temperature increase with depth. Typically this NCZ temperature increase is 30°–70° C. Salt slowly diffuses through the NCZ, but this process is remarkably slow. Solar ponds have been left for a whole year and remained functional. In actively ponds, salt diffusion is neutralized by adding some concentrated brine at the bottom of the NCZ while washing away the excess salt reaching the UCZ. Salt in this wash water is usually reconcentrated and recycled. An intriguing but untested alternative strategy for maintaining the salt gradient is the "falling pond" (Shachar, U.S. Pat. No. 3,372,691). In this pond fresh water would be slowly added to the surface of the pond. Simultaneously water vapor would be flashed out of warm brine extracted from below the NCZ. Consequently the NCZ would "fall". The rate of "fall" would be set to precisely counteract the upward diffusion of salt.

The stratified NCZ allows the underlying storage zone (SZ) to maintain a distinctly elevated temperature. This SZ has a high salinity (15% to saturated) and temperature (50°–90° C.), and is intentionally homogenized in salinity and temperature primarily by stirring associated with the process of heat withdrawl. This process involves gently "decanting" SZ brine, removing some heat, and then returning this brine to the SZ usually on the opposite side of the pond. Diffusers must be designed and positioned so that the kinetic energy in the extractions and return flows stirs the SZ but does not erode the NCZ. Nielsen (1980) has suggested positioning a plastic partition between the NCZ and the SZ to help control this erosion and seasonal migrations of this zone boundary. The SZ's thickness is matched to the thermal storage needed in a specific application, and is usually between 1.0 and 4.0 m.

Beneath the SZ is the groundzone (GZ). This zone is important in accurate studies of heat losses from a pond because ground water flows can remove a great deal of heat, and because the conductivity of soil, although highly variable, averages twice that of brine.

Solar ponds have been envisioned primarily as an energy source. The heated brine produced by ponds could be use to drive rankine cycle equipment for power generation, used in desalinization, or used directly in a variety of proesss, water, or space heating applications. The economics of ponds producing energy are coupled to the efficiency. Obviously for high efficiency heat losses must be minimized. Moreover water clarity greatly influences both the efficiency and temperature of heat extraction.

For perspective, the table below refers to Rabi-Nielsen's (1975) and Tybout's (1967) water clarity equations. These empirical equations are used in solar pond analyses, and bracket the water clarity achieved in existing solar ponds of conventional design. Rabi-Nielsen represents clearer water than Tybout. Assuming 7.0% heat withdrawal, small edge heat losses due to a large pond area, and typical insolation, a solar pond should average the temperature *elevations* shown in the first column.

| % HEAT WITHDRAWAL | 7.0% | 17.0% |
|---|---|---|
| (1) Rabl-Nielsen | 95° C. | 63° C. |
| (2) Tybout | 56 | 29 |

For Rabi-Nielsen's water clarity these temperature elevations may seem large, however one experimental solar pond has actually boiled under the summer sun (Weeks and Bryant, 1981). Alternatively, if 17.0% of the incident solar energy is withdrawn, the second column gives the resulting average temperature elevations. By comparing both columns, notice that increasing heat withdrawal diminishes the temperature elevation, and increasing clarity can increase either efficiency or the extractions temperature.

The expected temperature elevation must be considered when the salinity stratification is designed. For static stability, each stratum between the SZ and the UCZ must always stay denser than the overlying stratum. Moreover a complex effect named the double diffusive phenomena imposes a stricter "dynamic" stability requirement. For "dynamic" stability the density gradient with respect to salinity must increase 14% faster than statics requires (Tabor and Weinberger, 1981). The dynamic stability criterion may be even stricter over 3–6 month periods (Wittenberg, 1982). Israeli researchers use a still stricter criteria (change in salinity across the NCZ in $Kg/m^3$)/(change in °C. across the NCZ) $\geq 2.0$. These criteria could be conservative if applied to temperatures between 0°–30° C. since density is less sensitive to temperature in this range.

Another aspect of stability involves the most intense period of insolation, the summer solstice. The salinity gradient must be constructed so that during this solstice the local temperature gradient never becomes destabilizing in the most intensely absorbing stratum, at the top of the NCZ. During the rest of the year, obviously, such a salinity gradient would be more stable than is required. The UCZ thickness and water clarity influence the peak absorption intensity and therefore this aspect of stability. This problem can be controlled simply by using an UCZ with a typical thickness.

The following density data adopted from the international Critical Tables (1980) provides perspective on static stability.

| T (°C.) | NaCl % | density (*$10^{-3}$) |
|---|---|---|
| 100° C. | 7.0% | 1,0064 kg/m$^3$ |
| 50° C. | 2.0% | 1.00161 |
| 30 | 1.0% | 1.00261 |
| 25 | 3.5% | 1.02176 |
| 20 | 0.5% | 1.01786 |
| 10 | 0.5% | 1.00340 |
| 10 | 0.0% | 0.99972 |
| 4 | 0.0% | 1.00000 |
| 0 | 0.0% | 0.99987 |

Notice a 7.0% increase in salinity will offset the thermal expansion between 0° and 100° C. In the 0°–30° C. range, moreover, the effect of thermal expansion on density is milder, and can be offset by only a 1% change in salinity. Consequently, freezing fresh water would easily float on 25° C. seawater (3.5% salinity). For a temperature elevation from 10° C. to 25° C. a salinity increase from 0.5% to 3.5% will provide dynamic stability even using the stricter Israeli criteria since (30 Kg/m$^3$)/15° C. $\geq$ 2.0. The inventor has experimentally demonstrated a solar pond using fresh water overlying seawater and 5°–20° C. elevations over a three month period. Also notice that the temperature change between 0° C and 10° C. has a very minor effect on density; a pond will be virtually as stable in a 0° C. environment as in a 10° C. environment.

In addition, two major destabilizing forces, wind and large temperature differences, will often not coincide. The difference between a SZ's temperature and ambient will usually peak at dawn due to night cooling. Simultaneously the wind will usually be slight at dawn.

BACKGROUND ON AQUACULTURE

By definition, aquaculture is the cultivation of aquatic species as crops in water. The water can be fresh or saline. By definition mariculture is the cultivation of marine species as crops in marine water. The salinity of marine water can rise to 3.8%. Salinity in estuaries can be much lower, for example 2%. Mariculture is therefore one type of aquaculture.

Different aquaculture crops require different salinity waters. In fresh water, trout, tilapia, prawns, and catfish are established crops. An attractive, new, brackish water crop is spirulina, a blue-green algae that grows well in 2% salinity (Underexploited Tropical Plants . . ., 1975). Spirulina is native, however, to sphemeral desert lakes where salinity often exceeds 2%. It is therefore likely that some strains of spirulina can tolerate or even flourish in salinities above 2%. Spirulina produces huge yields per acre under the right conditions, and is 60–70% protein by dry weight. It is expected to become a major crop by the year 2000.

In marine salinities many fish, algae, shellfish, and crustacea are prospective crops. Shrimp is currently the leading mariculture crop in the world (Persyn, 1984). Mussels, oysters, scallops, abalone, and clams are also under cultivation. Cultivating algae for pharmaceuticals or food is common in east asia. Eel grass is a possible marine grain.

In salinities above 3.8%, Artemia, the brine shrimp is a potential crop (Sorgeloos, 1983). Artemia survives in 18% salinity, and grows well in 12%. Artemia produce cysts each winter. These are easily transported and then hatched live. Cysts currently sell for about $50/kg as a choice food for marine aquariums. Artemia is also a very attractive food for shrimp and fish mariculture. In addition, a company in Israel is cultivating a green algae, Dunaliella in 12–20% salinities (Rains, 1979). This algae produces glycerol to neutralize the osmotic pressure produced by high salinity. Glycerol will be extracted from the algae, and algae remains will be used as animal feed for to generate methane. Glycerol is already useful as a chemical, and could be the basis for synthesized food or energy.

There are many exotic species that live in very saline and/or geothermal water. Their biology is poorly explored. Probably some of these could become sources of unusual chemicals, or even food or energy. One possibility is nitrogen fixing blue-green algae which are believed to have grown in saline lakes and produced the fixed nitrogen deposits in the dry Atacama desert of Chile. Possibly these algae could be cultivated to produce fixed nitrogen.

Most crop species have preferred temperatures as well as preferred salinities. Typically growth increases as temperature increases up to an optimum which is specific for each species. Usually this is between 15° and 35° C. For example, the optimum for shrimp is 25°–26° C. For oysters it is 25° C. Temperatures much in excess of these optimums are usually damaging or fatal for the crop.

Both aquaculture and mariculture imply cultivation, meaning activities and management that enhance production. Cultivate is defined at "to promote or improve the growth of (a plant, etc) by labor and attention". For aquaculture and mariculture this applies to animals and algae as well as to plants. Examples of cultivation activities are discussed below.

First production can be increased by improving hatching, or the protection of hatchlings. In the simplest strategy young fry from the wild are drawn into sheltered bays or furrows from which predators have been removed. Often overall survival rates of hatchlings are increased so that the local wild crop is not diminished even though a cultivated crop is produced. Hatcheries can be much sophisticated. With shrimp, for example, fertile females are produced on schedule by the process of eye ablation (Persyn, 1984). The enormous quantity of eggs produced are then artificially fertilized in a laboratory. The fry are hatched along a production line. These sophisticated hatcheries often sell fry to growout ponds in which the young are raised to market size.

Control of predators and competitors using chemical treatments, or physical barriers is a common practice. The natural food supply can be augmented using artificial feeds at regular intervals. This improves the reliability of production and allows increased carrying concentrations per pond area. The monitoring and control of disease becomes increasingly important as the carrying concentration rises. Disease control involves classic options such as isolating or destroying the effected crop, using antibiotics, production in isolated modles, etc.

In many mariculture systems the water is changed frequently. Often this is the simplest way to dispose of wastes, and provide oxygen, fertilizer, and turbulence. In other systems oxygen is added using bubblers, and fertilizer is broadcast and settles through the pond. Turbulence is particularly desirable with single cell algae cultivation. Otherwise the rate of growth of algae is severely limited by the slow resupply of nutrients by diffusion.

Aquaculture production is greatly increased by warm, stable water temperatures. This is self-evident; most things grow faster in the summer. Growth year-round in summer-like temperatures could increase production by 3 or 4 fold. This is especially true if temperatures are held reliably at the optimum values for the crop. Warm temperatures are available all year in the tropics. Warm temperatures could also be generated by placing transparent plastic covers over aquaculture ponds (Brooks and Kimball, 1983) so that the ponds acted as "solar collectors". Or, plastic covers could insulate water heated by external sources. In addition, aquaculture in the warmed coolant from power plants or in warm, geothermal waters has been advocated and tested frequently.

When sunlight, fertilizer, and water temperatures are excellent, photosynthesis is often limited by the concentration of carbon-dioxide. Extra carbon-dioxide could be added to aquaculture waters and this could increase production, but it is necessary to keep the carbon-dioxide from escaping to the atmosphere. For aquaculture systems with concentrated animal crops, oxygen may have to be added to ponds.

Harvesting the crop is also a part of cultivation. Swimming species are usually harvested by partially draining a pond and then seining it. Sessile crops are usually removed manually. Large plankton can be filtered from the water.

Mariculture and aquaculture schemes are often described as extensive or intensive. This refers to the degree of management employed. Extensive systems use modest improvements over nature. This could be as simple as reducing predator populations, or sheltering hatchlings in an almost natural estuary. The simplest extensive systems rely entirely on natural food supplies. Harvests are low compared with intensive systems, and harder to predict. Intensive sytems typically include sophisticated monitoring of physical and biological performance, and artificial feeding. In some intensive designs oxygen, and/or carbon-dioxide is added to the water. Water is also changed frequently and fertilizer is added. In the most intensive systems cultivation occurs indoors in fiberglass tanks in rapidly circulating water. Intensive systems require much more capital initially, but yields are regular, predictable, and far greater per area.

DISCUSSION OF PRIOR ART

Using solar ponds to generate electricity has the following disadvantages. The pond must be kept very clear and operating at the highest temperatures to maximize the conversion efficiency. Essentially thermal performance must always be optimized, and management must therefore be sophisticated. Top be economical and produce reasonable blocks of power these ponds must be huge, i.e. 50 km$^2$. These ponds must be located where concentrated brine, inexpensive land, abundant sunshine, and sufficient fresh or brackish water are available in huge amounts. Usually this means remote desert locations. Transmission of electricity from these remote locations is possible, but could be a major, expensive task by itself.

If the application for a solar pond is some form of commercial heating, then the pond must be constructed adjacent to the consumer since sensible heat cannot be transported far economically. Consequently, the salt must usually be transported to the construction site. As a result, salt often is the largest cost component. Simultaneously solar ponds for commercial heating must be lined both to conserve the expensive salt and to spare the adjacent environment. These liners are expensive and must be extremely reliable since they are difficult to repair. Another disadvantage is that existing experimental ponds have in practice fallen to 30°–40° C. in the winter even without heat extraction. This is due to a combination of reasons, edge and ground heat losses, thick UCZ, and poor water clarity. Theoretically temperatures should stay higher. An ideal, new, solar pond application would be flexibly sited, and would not require highly elevated temperatures, sophiscated management, expensive, trucked in salt, or a pond liner.

There are disadvantages to heating aquaculture ponds with either geothermal heat or power plant waste heat. Neither source of heat is ideally distributed; power plants are relatively infrequent, and geothermal sources are often remotely located. Moreover, if the surface of a heated, outdoor pond is warm, it suffers rapid cooling by convection and evaporation. Consequently maintaining a large, temperature elevation in a homogenized, outdoor pond is difficult. Only a 5°–10° C. temperature elevation is expected with most aquaculture systems using power plant waste heat.

The disadvantage of moving operations to warm, tropical waters is that this removes from the United States a technology developed here, and the tropics are far from the major markets. The main disadvantage of using plastic covers on aquaculture ponds is that the amount of insulation, and therefore the temperature elevation, is modest. In addition, plastic covers add capital costs and maintainence complications.

Conventional, outdoor, aquaculture systems go through large temperature oscillationds as the ambient temperature and solar heating vary through the day. This is especially true in spring and fall. These oscillations reduce production since growth is inhibited in the morning when the water is cool. Diurnal temperature oscillations could also be a problem in uninsulated, outdoor ponds which were externally heated but at a constant rate.

Simple and economical means do not exist in the prior art for thoroughly isolating aquaculture pond modules from the environment and from each other. Isolation could help prevent the often catastrophic spread of disease through intensive systems. In addition, isolation could help retain volatile carbon-dioxide or fertilizer that had been added to a pond to accelerate growth. Isolation from the environment could help stablize temperature, salinity, and acidity, and thereby help optimize production. Isolation could also maintain a high salinity (or low salinity) SZ where the natural environment tends to dilute (or concentrate) salinity. This could be useful, for example, with shrimp farms in estuaries, where seasonal rains reduce salinity and consequently survival rates.

OBJECTS OF THE INVENTION

Accordingly the general object of my invention is to practice aquaculture in the warm SZ of suitably designed salinity gradient solar ponds, when or where aquaculture would otherwise be difficult due to cold, ambient temperatures.

More specifically, several objects of my invention are, to provide a novel, reliable source of warm water, which is available fall through spring, for aquaculture at any salinty.

to provide this warm water in an inexpensive, outdoor, solar pond which is insulated from surface heat losses by a NCZ, and can be located in a temperature climate, and at a wide variety of sites.

to reduce diurnal temperature oscillations is an aquaculture system by cultivating in a salt gradient solar pond.

to provide an inexpensive, insulated, outdoor pond for aquaculture which uses geothermal, fossil, or engine or power plant waste heat to entirely or partially heat its water.

to provide an application for solar ponds, in contrast to solar ponds used to generate electricity, that could be economically located out of the remote desert, that does not require excellent water clarity, large temperature elevations, or huge dimensions, and therefore does not require sophiscated management of its thermodynamics.

to provide an application for solar ponds, in contrast to solar ponds used to produced commercial heat, that does not require a solar pond liner, the expensive transport of salt to the construction site, or location adjacent to the consumer.

to provide a novel application for solar ponds with an easily distributed product, such as crops for food, feed, fuel, or chemicals, so that remote, desert, or small pond sites could be used economically.

SUMMARY OF THE INVENTION

This invention would realize these objects by cultivating crop species predominantly in the warm, lower layers of appropriately designed salt gradient solar ponds. The NCZ of such a solar pond would insulate the warm SZ, keep the SZ temperature raised to near the optimum, and buffer diurnal temperature oscillations. Consequently such ponds could provide moderately elevated, summer-like temperatures fall through spring.

For most marine or high salinity crops, the ponds would use salinity gradients which did not exceed the crop's salt tolerance. These ponds would usually be located in a comparably saline environment. Consequently these ponds could often dispense with a pond liner.

For fresh water, low salinity, and some marine crops, a transparent, horizontal partition would separate the NCZ and SZ. This partition would uncouple the salinity requirements of the NCZ and SZ. Consequently the NCZ could use a steep, very stable, salinity gradient, while the SZ used fresh water. This partition would also allow more turbulence in the SZ. A pond with a fresh water SZ could often dispense with a pond liner.

These pond designs would usually need to produce only 10°-25° C. temperature elevations. Both designs could be used in relatively small, outdoor complexes. Both designs could, but would not have to, be located in remote desert areas. In any case, the crops produced could be easily transported from a remote site or small facility.

At some locations, it may be desirable to supplement solar heating of the SZ. Geothermal, or waste heat from either a power plant of fossil-fueled engine are suitable sources when heat is to be added to the SZ regularly. In this case, NCZ water clarity could be of minor importance. A stand-by furnace would probably be the best source of heat for occassional or insurance heating. The insulating NCZ would greatly conserve these heat additions. The invention will be more fully described with reference to the accompanying drawing:

FIG. 1 shows the preferred embodiment of aquaculture in the SZ of a salinity gradient solar pond.

DETAILED DESCRIPTION AND OPERATION OF THE INVENTION

Figure 1:
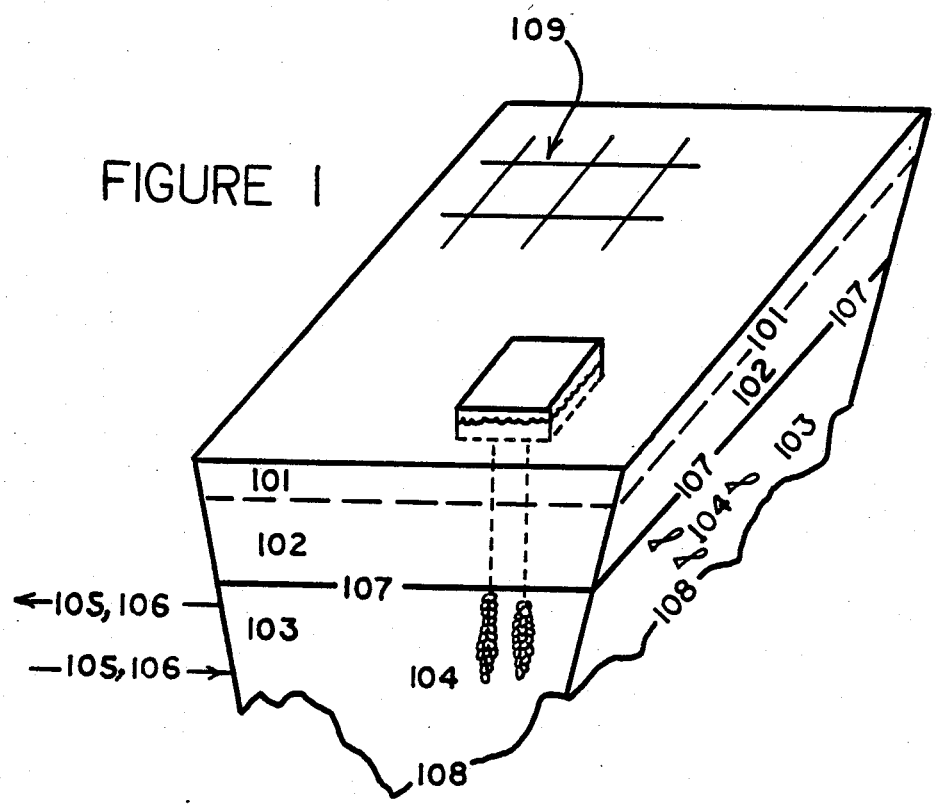

FIG. 1 shows the preferred embodiment of a salt gradient solar pond for aquaculture. As in a conventional solar pond, this pond develps an UCZ 101, a NCZ 102 in which the salinity, density, and temperature gradients increase with depth, and a warm, homogenized SZ 103.

This pond will be different from conventional solar ponds in three ways. First, the pond in this invention will have one or more crop species, 104, *cultivated* in and harvested from the SZ 103. Second, the temperature in the SZ will be maintained 105 at the appropriate value for optimum cultivation of the crop species 104, rather than for energy production. This temperature will be especially maintained aganist overheating. In most cases this temperature will be between 15° and 35° C. Third, the salinity in the SZ 103 will be maintained 106 at the appropriate value for the type of crop species 104.

The preferred method of maintaining salinity 106 and temperature 105 is by either adding or removing water at a temperature or salinity that will correct the deviation. This strategy has been demonstrated at conventional solar ponds for energy applications. There are, however, alternative strategies which could be effective in solar ponds for aquaculture.

If this SZ salinity is lower then the salinity required for stability at the bottom of the NCZ, then a partition 107 between the NCZ and SZ will be necessary. This will probably be transparent, plastic sheet. If not required, this partition 107 should be avoided as it adds complication and expense. With these solar ponds for aquaculture, the pond floor 108 could, but would not have to, be uneven or deep.

The use of the word *cultivated* is intentional and important to this invention. Recall cultivate is defined as "to promote or improve the growth of (a plant, etc) by labor and attention." For this aquaculture invention, this definition covers animals also. This invention requires that cultivation occur, but does not intend to claim use of specific cultivation practices. This is because this invention applies to many different crops, each of which will have cultivation preferences. As this invention matures it is expected that specific pond designs will be tailored to the different cultivation preferences of different crops.

For aquaculture, cultivation could involve one or more of the practices discussed in the section titled BACKGROUND ON AQUACULTURE, as well as day to day management. As review, these include sheltering young, controlling predators and diseases, artificially feeding, adding fertilizer, oxygen, or carbon dioxide, removing waste products, harvesting, or increasing turbulence. Crops could be floating, swimming, bottom dwelling, or suspended from rafts. For example, in *conventional* mariculture it is well-known that mussels are commonly cultivated as follows. A piece of nylon rope is attached to a concrete anchor at one end and an inexpensive float at the other such as a throw-away, plastic bottle filled with air. Tied on this rope spaced approximately 6"apart are horizontal members 3–6"in diameter. These can be pieces of plastic or old clam shells. When anchored in a bay of marine water the rope has some slack in it so that its weight is supported by the float. Juvenile mussel "spate" settle onto the horizontal members from the seawater and firmly attach themselves to these surfaces and begin to feed and grow. They feed by filtering the seawater for the natural growth of microalgae. As they grow more and more weight must be carried by the float, consequently with a little practice the mariculturist can easily judge when the mussels are ready to harvest by simply looking at the level of the floats in the water. To harvest the mussels the float, rope and anchor are pulled up into a boat, the mature mussels are forcibly removed, and the whole apparatus is then returned to the water to collect and grow a new crop of juvenile mussels.

In combination with the solar ponds for mariculture described in this invention very simple modifications to this cultivation practice would be required. Oxygen levels in the water would have to be insured by one of the means described elsewhere in these specifications. The horizontal members tied to the rope would probably be concentrated in the lower portions of the rope which will be down in the warm storage zone and possibly in the nonconvective zone of the solar pond. The mussels would grow significantly faster at the warmer temperatures available in the storage zone of these solar ponds. Harvesting could follow the conventional practice described above. This might temporarily raise surface salinities in the solar ponds. Therefore to compensate after a harvest more fresh water would be trickled from a diffuser to run across the surface of the solar pond.

It is the intent of this invention that these stratified solar ponds be durable, meaning they will be functional long enough to mature a crop. Consequently they may need maintainence to counteract stirring by the wind, and maintainence of the essential salt gradient. This maintainence could, however, occur without active means; for sufficiently small ponds stirring by the wind is limited, and salt diffusion is so slow that corrections can be spaced every 6–12 months. Alternatively, maintainence strategies which have been proven at conventional solar ponds, such as the use of a netting 109, or new strategies developed just for aquaculture solar ponds could be used. Since maintainence could involve no structures, or a variety of structures and still produce a pond which is durable enough to mature a crop, no specific structure or strategy for these two maintainence needs is claimed in the preferred embodiment.

Suppose Artemia or Dunaliella or other high salinity crops were cultivated in the SZ 103. Then the appropriate SZ salinity would be high, often greater than 10%. Consequently the salinity gradient in the NCZ could be similar to that in a conventional solar pond. Such a NCZ would be very stable since the temperature gradient would be less steep in an aquaculture solar pond than in a conventional solar pond. The partition 107 would usually not be used with high salinity crops.

Suppose marine crops were cultivated in the SZ 103. Then the appropriate SZ salinity would be near that of the ocean, 3.5%. In this case, the partitions 107 may or may not be desired. If the NCZ was fresh on top, and near 3.5% in the bottom it would be stable for the temperature range involved, so the partition is not needed. Alternatively the SZ could be near 3.5% salinity, the partition 107 could be used, and the NCZ could use a steep salinity gradient that exceeded 3.5% and therefore was extremely stable. Basicly the NCZ could be designed for optimum stability independently of the SZ.

Suppose fresh water or slightly brackish water crops were cultivated in the SZ 103. Then the SZ salinity would be nearly fresh, and the partition 107 would be required so that the NCZ could have a stable salinity gradient, unless the SZ temperature elevation was only a few degrees.

In addition to making cultivation of low salinity crops viable in solar ponds, the partition 107 would allow increased turbulence in the SZ 103. Whenever there is a partition 107 the SZ and NCZ salinity would not have to be coupled. Then it would be pragmatic to use a steep salt gradient in the NCZ 102 which would insure NCZ stability. With a partition 107, toxic chemical clarifiers could be used in the NCZ but kept out of the SZ. This would produce NCZ's that had excellent thermal performance. Of course, a toxic clarifier could not be used in a NCZ without a partition. A partition 107 would also confine the crop to the SZ. A partition 107 could be positioned by a variety of simple mechanical schemes despite the fact that density in the SZ is less than that in the NCZ.

While the above description contains many specificities, these should not be construed as limitations on the scope of the invention, but rather as an exemplification of preferred embodiments thereof. Many other variations are possible. The embodiment could use the preferred, conventional, wind-wave control method, which uses floating netting on the pond's surface to reduce the fetch over which waves can develop. There are other methods to reduce the effects of wind and waves. The pond could be surrounded by a fence or shrubs. Ponds could be built in sinuous, narrow channels or furrows. This would restrict fetch. In addition, the main effects of more wind and wave influence are reduced thermal performance and a thicker UCZ. Solar ponds for aquaculture could tolerate and may often require reduced thermal performance; therefore less effective wind-wave control may actually prove desirable.

Similarly there are alternative methods for maintaining the halocline. The proven strategy involves washing excess salt from the pond's surface, while adding new, brine with the appropriate salinity to the SZ. At conventional, solar ponds for energy production, the wash water is usually reconcentrated by evaporation since the salt is valuable. With ponds for mariculture located near the ocean, both new salt water and new fresh water will be virtually free; wash water could simply be discarded. Recall that the leading alternative method for maintaining a salt gradient is the "falling pond" concept. This could be applied to ponds for aquaculture.

Still another method of maintaining the halocline at a aquaculture solar pond, would be to replace the whole NCZ periodically. This is particularly feasible at mariculture ponds where both fresh and marine water will generally be free and abundant. Simply adding new NCZ waters regularly could dump excess heat, and help maintain water clarity. If some or all of the layers of an aquaculture solar pond are replaced periodically, it may be worthwhile to warm the new water with heat scavenged from the old water.

Regularly replacing the SZ is also an option. First gently extracting, treating, and gently returning water to a SZ has been repeatedly demonstrated in experiments at conventional solar ponds. With this arrangement, possible SZ treatments are adding oxygen or carbon-dioxide, adding fertilizer, antibiotics, or feed, removing waste products and removing or adding heat. By treatments we mean both monitoring and correcting these problems. For example, as is a standard practice at conventional solar ponds, storage zone water could be extracted through a horizontal infuser with a large cross-section so that this water's velocity was very slow and would not disturb the overlying gradient. This flow could be propelled by gravity or a pump, and the water could enter a small diameter holding tank. Air, oxygen or carbon-dioxide could then be added to the water in the holding tank using conventional air stone bubblers and compressors. Subsequently the enriched water could be returned to the solar pond using a pump or gravity and injected through a horizontal diffuser with a large cross-section so that, again, the flow velocity was slow enough so that the gradient was not disturbed. Instead of these water treatments, the extracted water might simply be discarded in favor of new water. This is particularly attractive for mariculture applications by the sea shore where marine water is free. In this case scavenging heat with a heat exchanger may be worthwhile.

Alternatively, the SZ could be treated by in-pond methods. Antibiotics, fertilizer or feed could be broadcast over the pond and settle to the SZ if there is no partition. Feeds might be designed with a pellet density so that they settle to the SZ but not the bottom. Oxygen or carbon-dioxide could be added by bubblers placed in the pond but modified so as not to disturb the essential NCZ. Bubbling in oxygen might consume waste products. Simple in-pond mechanical devices could automatically dump heat, or thin the NCZ to enhance heat losses. Recall that turbulence in the SZ will often enhance cultivation. Water in the SZ could be stirred by the kinetic energy in the return flow of brine that has been extracted, or by in-pond horizontally directed water jets. The pond could also contain means to monitor the temperarure and water clarity. Harvesting would normally occur right in the pond. Shrimp and fish are often harvested by draining a pond. This would disrupt the NCZ, however, NCZ's will be very easy to replace if they are made from fresh water on seawater. In winter it may be useful to overturn the ponds, let them cool and then harvest a "stunned" crop.

Many solar ponds for mariculture will be located by the sea shore where seawater is abundant in the environment. These ponds will have marine salinities in their SZ's. Consequently there will be little need to carefully conserve SZ water or protect the environment from it. Therefore such ponds will usually not need to be lined. Moreover the SZ in these ponds could be very deep and/or the bottom very uneven without much complication. It may therefore be possible to enclose a bay by the sea shore, and convert it to a mariculture solar pond simply by running fresh water over the top, and sheltering the surface from the wind. If the SZ has a high salinity, a solar pond for aquaculture will often be located at ephemeral, desert, brine lakes. For similar reasons. The SZ of such a pond could be deep and have an unleveled and unlined floor. Similarly, if the SZ is nearly fresh, the pond will most likely be located where leveling, lining, and SZ depth are also of minor importance.

With solar ponds used for aquaculture, regulating the SZ temperature may be required both annually and diurnally. To start with, temperatures will oscillate less in a solar pond than in an ordinary pond. This is because the thermal mass in the solar pond is much more effective since cooling is predominantly by upward conduction because natural convective cooling is suppressed. If desired temperature oscillations can be further reduced by increasing the thermal mass by using a deeper pond. With a SZ 5-10 meters thick it is even possible to buffer annual temperature oscillations. Normally the thermal mass in the SZ will be homogized in temperature by stirring, although this is not required. For example, the temperature in the storage zone of a solar pond could be measured using a thermocouple or the salinity measured using a thermocouple and hydrometer. Suppose a temperature reading was higher then the optimum temperature and therefore it was desirable to cool the storage zone. Then, using a standard practice at conventional solar ponds, storage zone water could be extracted through a horizontal infuser with a wide cross-sectional area so that the exit velocity was very slow and would not disturb the overlying gradient. This flow could be propelled through a pipe by a pump. This warm water could be disposed of and replaced with new water at the cooler ambient temperature. The new water could be pumped to the storage zone of the solar pond and injected through a diffuser. This diffuser would have a large cross-section so that, again, the flow velocity was slow enough so that the gradient was not disturbed. Alternatively, if the measured storage zone salinity was low, this procedure would increase salinity in the storage zone. If the measured storage zone temperature was below the optimum and therefore it was desirable to heat the storage zone water, then almost the same procedure could be followed. The only modification is that the new seawater injected into the storage zone could be heated in a suitable water heater before injecting. Alternatively, some or all of the water withdrawn from the storage zone could be heated and returned to the storage zone in the place of some of the new, cooler replacement water.

One advantage of solar ponds used for aquaculture, however, is that temperatures do not have to be extremely stable; for most crops large diurnal and annual temperature variations are normal. In contrast, a conventional, electrical power cycle would be shut down if the temperature dropped below the designed operating temperature. Moreover crops could be "rotated" so that pond temperatures and crop optimum temperatures coincided. For example, in the winter, peak SZ temperatures would be lower and a colder crop such as abalone or trout would be appropriate. In fall and spring with warmer SZ temperatures the crop could be warm water crops such as tilapia or shrimp.

Based on numerical calculations it is expected that the available solar energy will normally be more than sufficient to produce all the heating desired in a solar pond for aquaculture. On the one hand, winter solar energy supplies will be smaller and generally water clarity will be worse and therefore heat absorption will be reduced. On the other hand, heat needs will also be reduced because there will be no heat extraction, and because the temperature elevation will be smaller than in conventional solar ponds so heat losses will be smaller in every direction. If, however, solar energy reaching the SZ was insufficient to maintain the desired temperature, then heat from an external source could be added. If this was an occasional need then the best source of stand-by heat would probably be a small, fossil-fueled furnace or engine. At other locations it may be intended to add heat continuously. This would be the case if the water clarity in the NCZ was very poor so that little solar energy reached the SZ. In these cases attractive, external, heat sources would be geothermal heat, power plant waste heat, or even an adjacent solar pond, because these sources are steady. A local fossil-fueled engine could cogenerate heat for the SZ and on-site power. At an existing geothermal aquaculture facility, the ponds could simply be overlain with an insulating NCZ. By greatly reducing surface heat losses, this would greatly extend the geothermal resource. Supplying heat to a SZ from a conventional, flat-plate collector is likely to be uneconomical.

Care will be needed with solar ponds for aquaculture so that the SZ does not overheat and damage the crop. Heat could be removed using self-regulating thermosyphons extending down through the pond. Warm SZ water would surface through these pipes, cool by evaporation, and then resettle to the SZ. Temperature measurements would be used to regulate the water throughflow rate.

A simpler way to dump heat may be to drain off part of the NCZ. A thinner NCZ will loose heat faster by conduction. When an aquaculture solar pond is constructed from abundant fresh and marine water by the shore this strategy will be attractive because the waters can be disposed of and replaced at almost no cost. Changing the NCZ's thickness is a good annual cycle strategy. Removing the NCZ completely is an extension of this idea, and likely for the summer.

Alternatively the amount of solar energy reaching and thus heating the SZ could be reduced simply by thickening the UCZ. This could be extremely easy to implement and reverse by adding or removing UCZ water. These two strategies could be combined by converting the upper part of the NCZ to a lower part of the UCZ. This would doubly reduce heating in the SZ. Also the UCZ might simply, reversibly be clouded. Another simple strategy for reducing heating of the pond is to float opaque material or liquids on the pond surface to reduce the amount of sunlight penetrating the pond. This would interfere, however, with photosynthesis. Heat could be removed or added if and when water is removed from the SZ, treated, and then returned to the SZ, or if and when water is removed from the SZ and replaced with new water.

The intent of this invention is to grow crops in the SZ of a solar pond. Swimming or phototaxic algae, however, could migrate from the SZ to the NCZ if there is no partition 107. This needs to be investigated. Possibly swimming species such as shrimp would migrate to the NCZ level with the most suitable temperature. This would conveniently reduce the need to regulate the SZ temperature, and the danger of overheating a species confined to the SZ. Moreover the SZ could then actually be heated to temperature too hot for a crop, but useful for thermal storage. The crop would live in the cooler NCZ which would be heated by conduction from the SZ. Shrimp cold handle the salinity changes in a NCZ. Hopefully mobile crops won't stay in the cold. If this is a problem a partition 107 may be needed.

A mobile crop in the NCZ would partially stir the NCZ. This would increase the upward migration of both heat and salt. With mariculture solar ponds located where both fresh and salt water are abundant the NCZ can be regularly replaced therefore this increased stirring should be tolerable. The preferred embodiment of this invention would cultivate crops in the SZ. Because of this possibility of cultivating in the NCZ also, the cultivation will hereafter be described as occuring *predominantly* in the SZ.

Only limited amount of turbulence can be added to the SZ of this invention with a partition 107, and even less without a partition. Calculations show, however, that safe SZ extraction velocities can easily replace water at the replacement rates now used in the most intensive systems without adding excessive turbulence to the SZ. Recall some species, like trout, need high levels of turbulence to supply oxygen, and reduce disease. Also, algae needs turbulence otherwise growth will quickly be limited by the slow diffusion of nutrients to the algae.

This last reason suggests an alternative strategy. Mass will diffuse through a NCZ about 100 times slower than heat. Consequently volatile fertilizer added to the SZ would all be retained with only very minor losses. Possibly algae could be grown in nearly stagnant water with very high fertilizer concentrations, but with minor fertilizer losses. This might produce the same access to nutrients as growing algae in well stirred, but less fertilized water. Possibly this strategy could eliminate the need and cost for a partition 107.

Similarly the NCZ would severely limit diffusion losses of carbon-dioxide dissolved in a SZ. This could be important even if there was a partition 107 because plastic partitions may be permeable to carbon-dioxide. High SZ concentrations of oxygen could be maintained for the same reason.

NCZ's really produce inexpensive, isolated, SZ environments. High or low salinity, and high temperature environments are therefore possible in regions where they would not occur naturally. In addition, a SZ will be isolated from disease sources in the surrounding environment. Disease agents are unlikely to diffuse all the way down through a NCZ. SZ access is controlled at a few locations where water is added or withdrawn. Consequently solar ponds for aquaculture could be built in modules and the spread of disease could be reduced.

One possible problem will be the need to clean the partition 107. Fouling can be controlled on the top side by algacides if these are used in the NCZ. The best control, in general, will probably be careful selection of a plastic that resists fouling. In addition, for some applications the partition 107 may not need to be clean or even transparent. Another possible problem with this design is the reduced acces to the aquaculture crop compared with cultivation in conventional, open aquaculture ponds. A partitioned SZ could be pressurized slightly to guard aganist NCZ salt leaking into a fresh water SZ; instead, SZ fresh water would leak into the NCZ. Also note that we could use a partition 107 and still have the salinity in the SZ essentially equal to the salinity in the bottom of the NCZ. A difference in salinity here is not essential to the invention.

It is worthwhile now to review how the embodiment in FIG. 1 would be used with the main candidate crops. Most ocean crops would use a 3.5% SZ salinity and no partition 107 between the NCZ and SZ. The SZ would be kept at 20°–25° C. all winter. Such ponds would be located near the ocean shore. Notice just how simple this application of the invention really is. Basically fresh water would run over seawater in an unlined basin. The sun would then heat the seawater to summer water temperatures. This would allow year round mariculture in the temperate regions of the world. Because of the high degree of environmental control this system could produce like expensive, intensive, indoor, mariculture systems, yet really be an inexpensive outdoor pond. We can have warm, stable isolated, carbon-dioxide rich outdoor farms producing near the maximum.

For Artemia or Dunaliella, 8–18% salinity, 30° C., no partition 107, and no pond liner would be used. This type of year round aquaculture pond would be built at both small and large, now useless, ephemeral, desert lakes. The UCZ could use low quality water with 1–3% salinity. These crops could be shipped to distant markets.

A pond using a 2% salinity, 30°–35° C., and no partition may be possible for Spirulina and other brackish water species. More likely Spirulina would use 2% salinity, a partition and an ephemeral, desert lake location. Possibly Spirulina strains that can thrive in much higher salinity will be found. Then Spirulina could grow in ponds like those for Dunaliella or Artemia.

All the fresh water species would use nearly fresh water SZs, appropriate SZ temperatures (12°–25° C.), and a partition 107. They could locate either where fresh water for the SZ or brine for the NCZ was abundant. The fresh water needed by these ponds could be finite and well conserved, therefore these ponds may work better at desert locations. On the other hand, these ponds may need to be lined if located in the desert.

The density of 0° C. water is almost the same as that of 10° C. water with the same salinity. Consequently these ponds will be virtually as stable in 0° C. or less ambient temperature as in 10°. In addition, solar energy supplies are generally expected to be more than adequate throughout temperate latitudes. Consequently, this invention's way to produce warm water aquaculture is expected to be widely applicable in most of the United States.

The basic preferred embodiment would use no partition, no pond liner and a solar heated seawater SZ under a fresh water UCZ. This could encounter problems with stability, water clarity, or adequate heating, but each of these problems can be avoided for some applications by a variation in the design. If stability is the problem we could add a partition and uncouple NCZ-SZ salinity. If clarity and thus heating is a problem we can use a partition and a clarified NCZ, or we can add heat to the SZ. If partitions won't work then surely we can find some desert crops like Artemia that will grow fine in a stable, high salinity, close to conventional solar pond. Some of these variations on the basic embodiment will succeed.

It is also worth reviewing how this invention circumvents the shortcomings of conventional solar pond applications. First this application could be used extensively. Mariculture ponds could be set up along most shores. If shore land is limited or environmentally sensitive then mariculture operations can move inland to semi-desert areas where both fresh and salt water are available. Ponds with partitioned off, fresh water SZs could be set up anywhere conventional solar ponds could be built. Similarly high salinity crops in solar ponds will be popular at desert lakes, or along oceans where seawater can be concentrated to brine. It will be easier to go where ponds can be built very cheaply and ship out the food produced. For all of these applications high temperature elevations and excellent pond clarity and performance would not be needed. Moreover solar energy supplies usually will be adequate. These applications could tolerate more temperature oscillation than many conventional energy pond applications. In any case, temperature oscillation will be easy to control by adding or dumping heat. Whether near the shore with marine or fresh water SZs, or in the desert with concentrated brine SZs, liners often won't be needed. Since the SZ and the environment will be similar in salinity, there is no need to separate them, and the salt will not be worth saving. These ponds do not have to be big. Consequently desert locations which are too small to be attractive for solar ponds for power production could now be useful for food production.

Accordingly, the scope of the invention should be determined not by the embodiment illustrated, but by the appended claims and their legal equivalents.

What is claimed is:

1. A method of warm water alga aquaculture in a colder, ambient environment, the steps comprising:
   a. providing a durable, salt gradient solar pond having an upper convective zone of low salinity, an intermediate nonconvective zone in which salinity increases with depth, and a lower storage zone,
   b. selecting the optimum combination of temperature and salinity values for the fluid of said storage zone for the growth of at least one selected algae species,
   c. selectively controlling the thickness and salt gradient of said nonconvective zone,
   d. adding or removing heat or salt to or from said storage zone to maintain the temperature and salinity in said storage zone near said optimum combination of values for the growth of said selected algae species without disturbing the desired salt gradient differential in said zones,
   e. selectively adding carbon dioxide to the fluid of said storage zone and maintaining dissolved carbon dioxide concentrations either said storage zone, in order to maintain optimum growth of said selected algae species without substantially altering or disturbing the salt gradient differential between the upper convective zone and the storage zone, whereby the nonconvective zone would severely limit diffusion losses of carbon-dioxide while algae growth rates would be higher than is possible with lower concentrations of carbon dioxide, and
   f. cultivating said algae species predominantly in said storage zone of said solar pond while maintaining said optimum conditions.

2. The method of claim 1 including the step of adding to said storage zone geothermal heat, waste heat from power plants, waste heat from a fossil fueled engine, heat from a conventional solar pond or heat derived directly from burning fossil fuel.

3. The method of claim 1 including the steps of extracting old fluid from said storage zone, and adding refreshed or replacement fluid to said storage zone, whereby this exchange could add or remove heat or salt or renew supplies of fertilizer nutrients, antibiotics or carbon-dioxide.

4. The method of claim 1 including the steps of extracting old fluid from said storage zone, adding refreshed or replacement fluid to said storage zone, and transferring heat from said old fluid into said refreshed or replacement fluid, whereby this exchange could add or remove heat or salt or renew supplies of fertilizer nutrients, antibiotics or carbon-dioxide.

5. The method of claim 1 in which said selected algae species are marine species.

6. A method of warm water aquaculture of species native to salinities higher than that of seawater in a colder, ambient environment, the steps comprising:
 a. providing a durable, salt gradient solar pond having an upper convective zone of low salinity, an intermediate nonconvective zone in which salinity increases with depth over a thickness of at least fifteen centimeters, and a lower storage zone in which salinity is maintained at levels higher than fifty parts per thousand,
 b. providing means to protect said upper convective zone from stirring by wind and waves,
 c. selecting the optimum combination of temperature and salinity values for the fluid of said storage zone for growth of a selected aquatic species which is native to salinities higher than that of seawater,
 d. adding or removing heat or salt or from said storage zone to maintain the temperature and salinity in said storage zone near said optimum combination of values for the growth of said selected aquatic species without disturbing the desired salt gradient differential in said zones,
 e. selectively adding essential growth sustaining gases to the fluid of said storage zone or removing harmful gases therefrom to maintain optimum growth of said aquatic species without substantially altering or disturbing the salt gradient differential between the upper convective zone and the storage zone, whereby oxygen would not be fatally depleted from said storage zone by an animal species and carbon dioxide would not be fatally depleted from said storage zone by a plant species, and
 f. cultivating said aquatic species predominantly in said storage zone of said solar pond while maintaining said optimum conditions.

7. The method of claim 6 including the step of adding to said storage zone geothermal heat, waste heat from power plants, waste heat from a fossil fueled engine, heat from a conventional solar pond or heat derived directly from burning fossil fuel.

8. The method of claim 6 including the steps of extracting old fluid from said storage zone, and adding refreshed or replacement fluid to said storage zone, whereby this exchange could add or remove heat or salt or renew supplies of food, fertilizer nutrients, antibiotics, oxygen or carbon-dioxide, or remove waste products.

9. The method of claim 6 including the steps of extracting old fluid from said storage zone, adding refreshed or replacement fluid to said storage zone, and transferring heat from said old fluid into said refreshed or replacement fluid, whereby this exchange could add or remove heat or salt, renew supplies of food, fertilizer nutrients, antibiotics, oxygen or carbon-dioxide, or remove waste products.

* * * * *